(12) United States Patent
Payne

(10) Patent No.: US 10,802,519 B2
(45) Date of Patent: Oct. 13, 2020

(54) AUTOMATIC CONFIGURATION OF MULTIPLE-PHASE DIGITAL VOLTAGE REGULATOR

(71) Applicant: Renesas Electronics America Inc., Milpitas, CA (US)

(72) Inventor: Michael Lyndon Payne, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/353,609

(22) Filed: Mar. 14, 2019

(65) Prior Publication Data

US 2019/0361472 A1 Nov. 28, 2019

Related U.S. Application Data

(60) Provisional application No. 62/676,856, filed on May 25, 2018.

(51) Int. Cl.
*H02M 3/158* (2006.01)
*G05F 1/46* (2006.01)
*G05F 1/56* (2006.01)

(52) U.S. Cl.
CPC .............. *G05F 1/56* (2013.01); *G05F 1/465* (2013.01)

(58) Field of Classification Search
CPC .. H02M 3/1584; H02M 3/158; H02M 3/1586; G05F 1/465
See application file for complete search history.

(56) References Cited

U.S. PATENT DOCUMENTS

| | | | | |
|---|---|---|---|---|
| 7,446,430 B2* | 11/2008 | Leung | ...................... | H02J 1/08 307/38 |
| 7,502,240 B2* | 3/2009 | Leung | ............... | H02M 3/33515 307/40 |
| 8,018,367 B2 | 9/2011 | Cheung et al. | | |
| 8,638,081 B2* | 1/2014 | Heineman | ................. | H02J 1/08 323/283 |
| 8,710,810 B1* | 4/2014 | McJimsey | ........... | H02M 3/1584 323/272 |
| 9,729,063 B2* | 8/2017 | Kim | ........................ | H02M 1/42 |
| 9,806,620 B2* | 10/2017 | Melendy | ............. | H02M 3/1584 |
| 2006/0149396 A1* | 7/2006 | Templeton | .............. | H02J 1/102 700/22 |
| 2007/0040657 A1* | 2/2007 | Fosler | ...................... | H02J 1/08 340/333 |
| 2007/0076453 A1* | 4/2007 | Schultz | ................... | H02J 1/102 363/72 |
| 2010/0201405 A1* | 8/2010 | Ahmad | ............... | H02M 3/1584 327/108 |
| 2011/0133553 A1* | 6/2011 | Bui | ...................... | H02M 3/158 307/31 |

(Continued)

*Primary Examiner* — Thienvu V Tran
*Assistant Examiner* — Sisay G Tiku
(74) *Attorney, Agent, or Firm* — Foley & Lardner LLP

(57) ABSTRACT

One or more of the present embodiments allows multiple controllers to be automatically configured as a single or multi-rail voltage regulator system using a local bus that can communicate between controllers with a minimal set of pinstraps. This allows the system to be configured with a reduced set of configuration pins and without the need for stored configurations in the controller's own memory or configurations performed by an external host.

21 Claims, 7 Drawing Sheets

(56) References Cited

U.S. PATENT DOCUMENTS

| | | | |
|---|---|---|---|
| 2011/0169471 A1* | 7/2011 | Nagasawa | H02M 3/1584 |
| | | | 323/283 |
| 2013/0141952 A1* | 6/2013 | Kaneko | H02M 7/493 |
| | | | 363/72 |
| 2014/0056037 A1* | 2/2014 | Iijima | H02M 3/1584 |
| | | | 363/21.17 |
| 2014/0334196 A1* | 11/2014 | Chen | H02M 3/1584 |
| | | | 363/21.04 |
| 2015/0188406 A1* | 7/2015 | Nishi | H02M 3/1584 |
| | | | 323/217 |
| 2018/0048232 A1* | 2/2018 | Adell | H03L 7/085 |
| 2018/0314281 A1* | 11/2018 | Remis | G05F 1/56 |

* cited by examiner

AUTOMATIC CONFIGURATION OF MULTIPLE-PHASE DIGITAL VOLTAGE REGULATOR

CROSS-REFERENCE TO RELATED APPLICATIONS

The present application claims priority to U.S. Provisional Application No. 62/676,856 filed May 25, 2018, the contents of which are incorporated by reference herein in their entirety.

TECHNICAL FIELD

The present embodiments relate generally to power control, and more particularly to automatic configuration of a multi-phase digital voltage regulator.

BACKGROUND

The configuration of a multi-phase voltage regulator is needed to ensure that all phase components for any desired number of phases and master/slave designations operate together properly. Existing technology requires device configuration to come from an external source either through pin strap mechanisms or host communications. It would be desirable to reduce the external pinstraps requirements and to eliminate the need for stored configurations in an external host or local memory, among other things.

SUMMARY

One or more of the present embodiments allows multiple controllers to be automatically configured as a single or multi-rail voltage regulator system using a local bus that can communicate between controllers with a minimal set of pinstraps. This allows the system to be configured with a reduced set of configuration pins and without the need for stored configurations in the controller's own memory or configurations performed by an external host.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
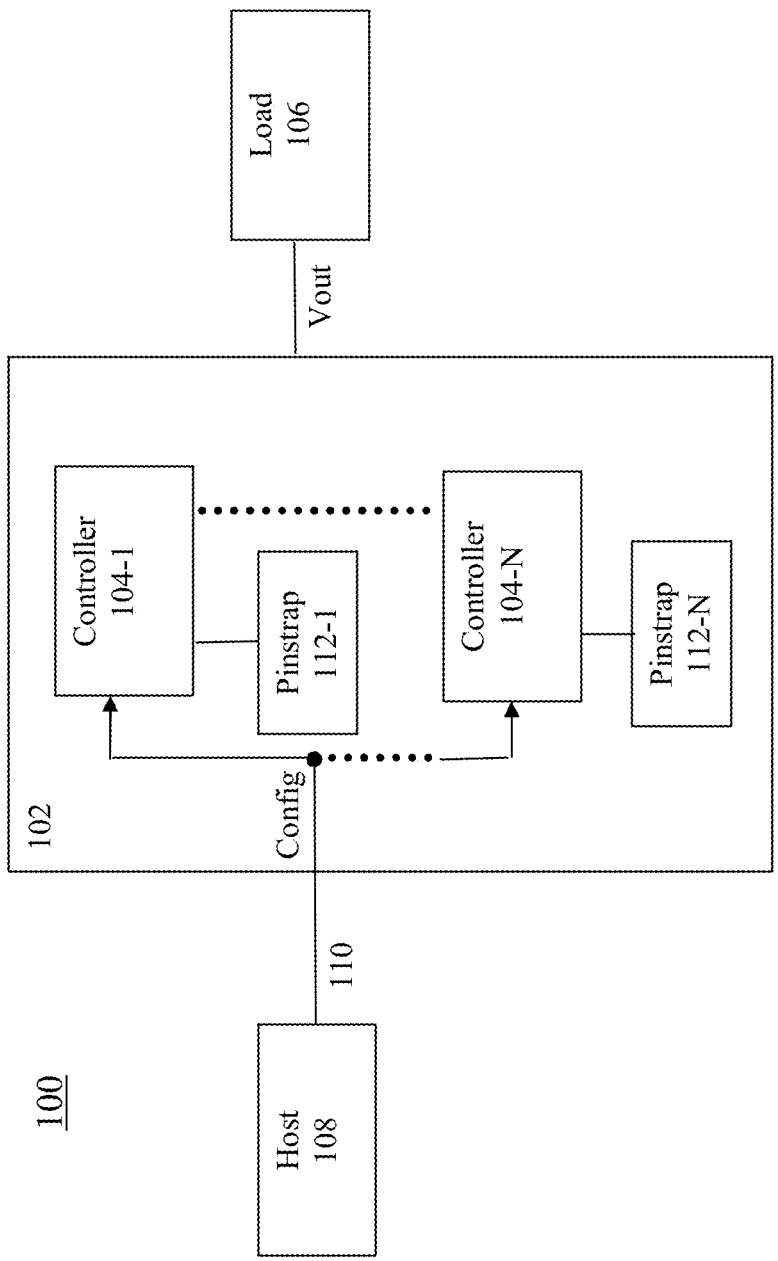
FIG. 1 is a block diagram illustrating an example multi-phase regulator system communicating with an external host for performing configuration.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

By way of background, DC-to-DC voltage conversion is often performed by switching voltage regulators, or step-down regulators, also referred to as voltage converters, point-of-load regulators, or power converters, converting an input voltage to a regulated output voltage as required by one or more load devices. More generally, voltage regulators and current regulators are commonly referred to as power converters, and as used herein, the term power converter is meant to encompass all such devices. Switching voltage regulators often use two or more power transistors to convert energy at one voltage to another voltage. One common example of such a voltage regulator, commonly called a buck regulator or buck controller operates to convert an input voltage (e.g. from an adapter, a power line, battery, etc.) to a lower regulated voltage. It should be noted that although the present embodiments will be described in connection with an example application in a buck regulator, this is not limiting. Rather, one or more principles of the present embodiments can also be practiced in other types of regulators such as buck-boost and boost regulators.

Voltage regulators are sometimes implemented using a current share configuration in which power is distributed through shared voltage supplies. Distributed power through shared point of load supplies has a number of compelling advantages over a single point of load supply, or regulator. Distributed power or current sharing may be used to accommodate the ever increasing current demands associated with low voltage applications through better efficiency over a wide range of output currents, reliability through redundancy, and distributed heat dissipation.

A block diagram illustrating aspects of an example system a buck regulator having a current share configuration is shown in FIG. 1.

As shown, system 100 includes a multiphase voltage regulator 102 including a "rail" of a plurality of controllers 104-1 to 104-N commonly coupled to provide power with a regulated voltage to a load 106 (e.g. a server, storage equipment, telecommunication and data communication equipment, one or more integrated circuits such as FPGA, ASIC, DSP, memory, etc.). Each of the controllers 104-1 to 104-N is thus associated with a respective phase of the multiphase voltage regulator 102. Each controller 104 can be implemented in various ways. In one common implementation, each controller 104 is implemented as a single digital integrated circuit (with an external pair of power FETs and inductor, not shown). As further shown in FIG. 1, system 100 includes a host 108. During operation of system 100, host 108 can receive operating, fault, and other information from controllers 104-1 to 104-N via a bus 110 (e.g. SMBus/PMBus), and can provide certain control or other commands to controllers 104-1 to 104-N via bus 110.

As set forth above, a multiphase buck regulator 102 having a current share configuration has many advantages such as efficient voltage conversion over a wide range of output currents, fast transient response, reliability through redundancy, and distributed heat dissipation. However, the present applicant recognizes several drawbacks and challenges of conventional approaches such as that shown in FIG. 1. For example, when each controller 104 is implemented as a separate integrated circuit, a substantial amount of configuration typically needs to be performed for the voltage regulator 102 to operate properly as a combined entity. For example, each controller 104 needs to be configured with information such as whether it is a master or slave phase, how many total phases are in the system, which phase number of the total number of phases it is (for phase interleaving, for example), etc. Moreover, depending on whether the controller 104 is a master or slave, still further configuration may need to be performed so that it properly operates in that role (e.g. enabling sharing of current information with other phases if it is the master).

These and other configurations can be performed in a variety of ways. In an example where each controller 104 is implemented by a separate integrated circuit, some configuration can be implemented using pinstraps 112 that are physically and/or electrically connected to one or more pins of the integrated circuit package. However, the number of pins on an integrated circuit is typically very limited and it is preferable to have as few pins as possible dedicated to implementing configuration, as opposed being available for dynamic use during operation of system 100. Some configurations can be performed by an external entity such as host 108 via bus 110, such as during a power up of system 100. However, this requires host 108 to know and store detailed information regarding the controllers 104, as well as to externally and independently store data and programs to perform the necessary configuration of voltage regulator 102 during every power up, which can be burdensome and difficult to manage. Still other configurations can be performed by storing information in each controller 104 (e.g. in a non-volatile memory (NVM) not shown), which information the controllers can access and use during power up to allow it to operate in the proper role. However, the amount of NVM that is available in each controller 104 may be very limited and it may not be sufficient to store all of the necessary information.

Relatedly and additionally, the number of phases (i.e. the number N) is typically fixed after the system 100 is configured and being used in operation. It may be subsequently determined from information gained during operation of system 100 that the number of phases (i.e. the number of controllers 104) is not appropriate for the demands of load 106. If that is the case, significant work and expense may be required to adjust the number of controllers 104, as well as to correspondingly change the configuration information needed (e.g. in controllers 104, as well as host 108) for the adjusted number of controllers 104 in system 100 to operate properly.

According to certain aspects, therefore, one or more of the present embodiments allows multiple controllers to be automatically configured as a single or multi-rail system using an onboard bus that can communicate between controllers with a minimal set of pinstraps. This allows the system to be configured with a reduced set of configuration pins and without the need for stored configurations in the NVM or external host. This essentially allows flexible plug-and-play for modular digital voltage regulation applications.

Figure 2:
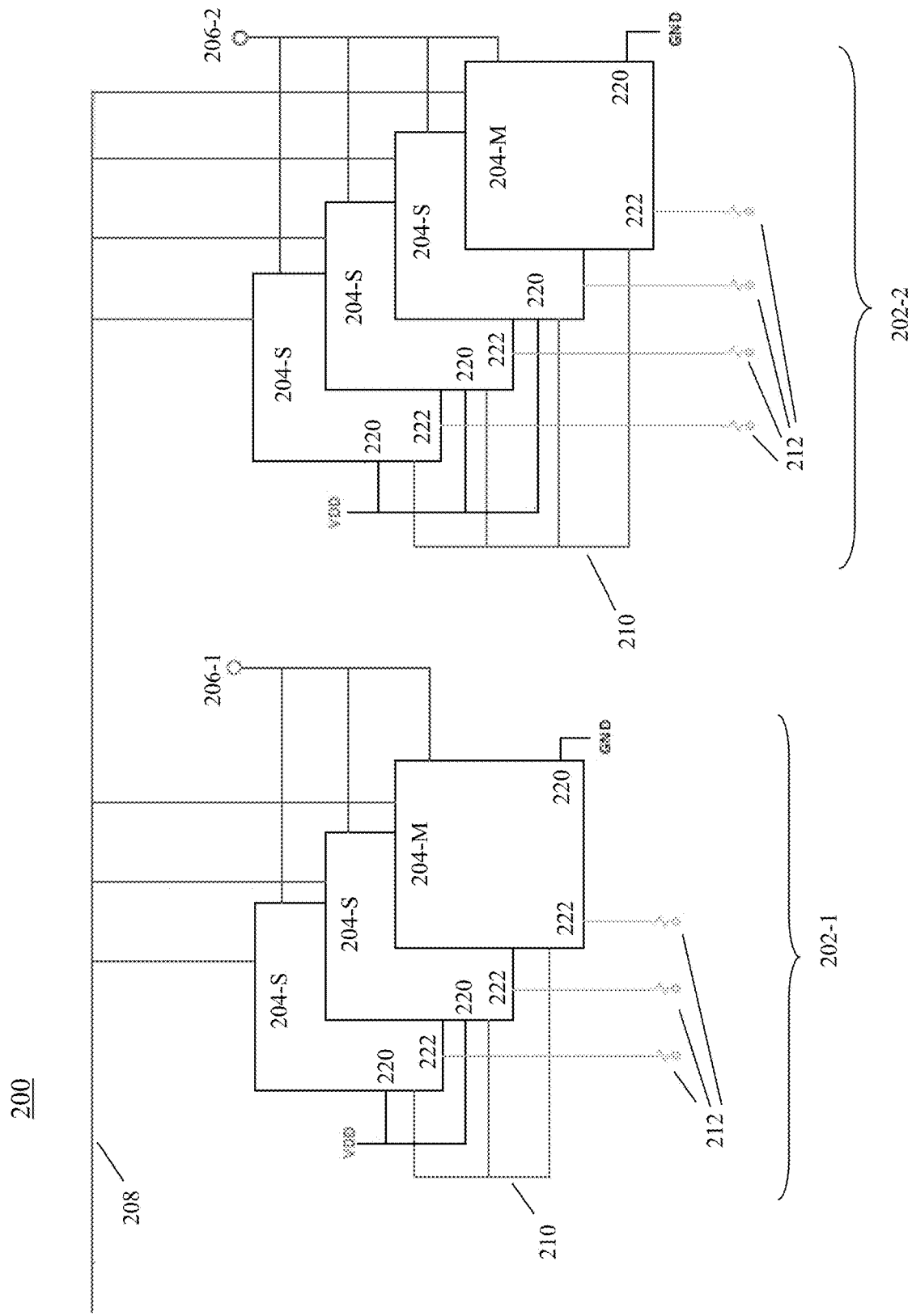
FIG. 2 is a block diagram of an example system having a plurality of rails including multiphase controllers according to the present embodiments.

FIG. 2 is a block diagram illustrating an example system according to embodiments.

In some embodiments such as the one illustrated in FIG. 2, the system 200 includes a plurality of rails (e.g. rail 202-1 and 202-2 as shown), with each rail 202 comprising an independent plurality of controllers 204 (i.e. phases), with the number of controllers 204 in each rail 202 possibly being different from each other. For example, as shown in FIG. 2, rail 202-1 includes three phases/controllers 204 and rail 202-2 includes four phases/controllers 204. The controllers 204 in each rail 202 are interconnected together to supply a respective regulated output voltage 206 to one or more loads (not shown), which may or may not have the same voltage value. Although only two rails are shown, it should be noted that the number of rails is not limited to this number and in some embodiments, the number of rails can be eight or higher. As further shown in FIG. 2, the controllers 204 of each rail 202 are all communicatively coupled to a bus 208 (e.g. SMBus/PMBus), which may be further communicatively coupled to a host (not shown) such as a host as described above in FIG. 1. Meanwhile, each controller 204 within a rail 202 is communicatively coupled to each other in the same rail via a local bus 210.

According to some aspects, the embodiment shown in FIG. 2 uses only two pins on each controller 204 for configuration, in particular master/slave pin 220 and voltage/address pin 222. The master/slave pin 220 contains information indicating whether the controller is the master or a slave (denoted as 204-M or 204-S, respectively in FIG. 2). In this example, a controller 204 is configured as a master by connecting the pin 220 to ground or other reference potential, whereas a controller 204 is configured as a slave by hard-wiring or connecting the pin 220 to Vdd or other voltage supply. As will be described in more detail below, this simple configuration of just two pins on controller 204, as well as firmware stored in each controller 204 and inter-controller communications via local bus 210, allows for each rail 202 to be automatically configured for correct operation, regardless of the number of phases/controllers that are coupled together in each rail. According to additional aspects, this allows each rail 202 to be automatically configured for correct operation without the involvement of, or configuration performed by, an external entity such as host 108 in FIG. 1.

In the example of FIG. 2, the voltage/address pin 222 is used to determine the value of the output voltage 206 for the respective rail 202, and also provides controller unique ID and address information for allowing each controller to be separately accessed via bus 208 and identified by other controllers via bus 210, as will be described in more detail below. In embodiments, the configuration of voltage/address pin 222 is implemented using a pinstrap, wherein the resistance values of a resistor network that is hard-wired or connected to pin 222 are used to select one of a plurality of predetermined combinations of output voltages and addresses. This can be done using techniques such as those described in U.S. Pat. No. 8,018,367, the contents of which are incorporated herein by reference herein in their entirety.

Figure 3:
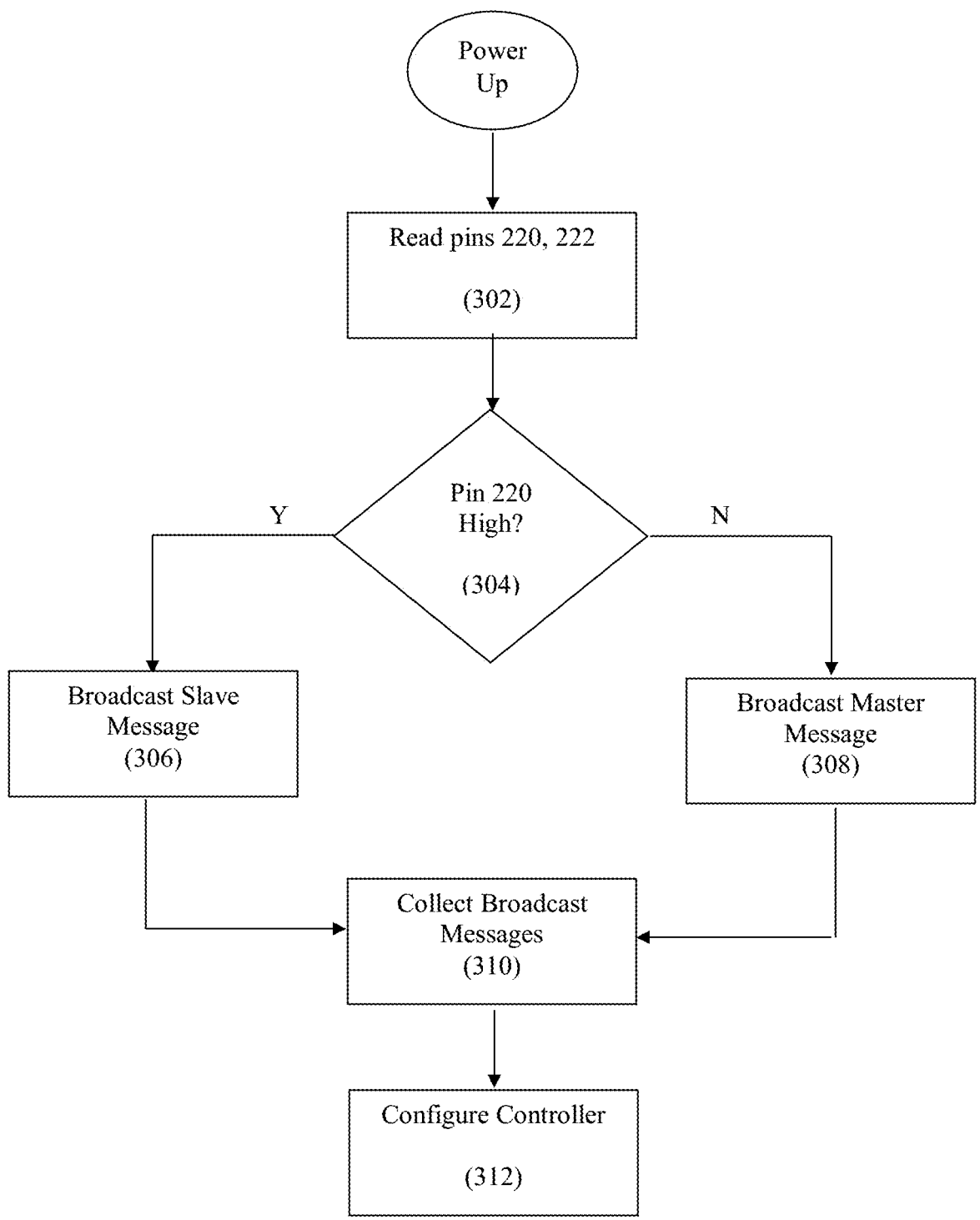
FIG. 3 is a flow diagram illustrating an example methodology of performing autoconfiguration of multiphase controllers such as those shown in FIG. 2 according to embodiments.

FIG. 3 is a flowchart illustrating an example methodology according to embodiments such as that shown in FIG. 2.

When the system is powered up each controller 204 reads the master/slave pin 220 and voltage/address pin 222 in block 302. If it is determined in block 304 that the pin 220 is high then the controller 204 is a slave phase and it sends an auto configuration message indicating its unique ID in block 306 to the other controllers via bus 210. If the pin 220 is low then the controller 204 knows it is the master phase and in block 308 sends an auto configuration message indicating that it is the master and what the SMBus/PMBus base address will be from its own voltage/address pin 222. In block 310 all of these auto configuration messages are received by the controller 204 from all of the controllers via bus 210, perhaps after waiting for a predetermined timeout interval. From these messages, each controller knows how many total controllers are in the system, which controller is the master, and, based on the master's SMBus/PMBus base address, and what SMBus/PMBus address range to use.

Using this information, each controller configures itself in block 312 based on following example algorithm:

The master controller 204-M will be phase 0. This controller will supply an external clock and telemetry information to the slave controllers 204-S.

The slave controller with the lowest unique ID will be phase 1. The next lowest unique ID will be phase 2 and so on.

The controllers 204 will set their interleave values according to their phase numbers and the total number of phases in the rail 202.

The slave phases will set their SMBus/PMBus address based on the master phase base address. Phase 1's address will be the master's address plus 1, phase 2's address will be the master's address plus 2, and so on.

Figure 4:
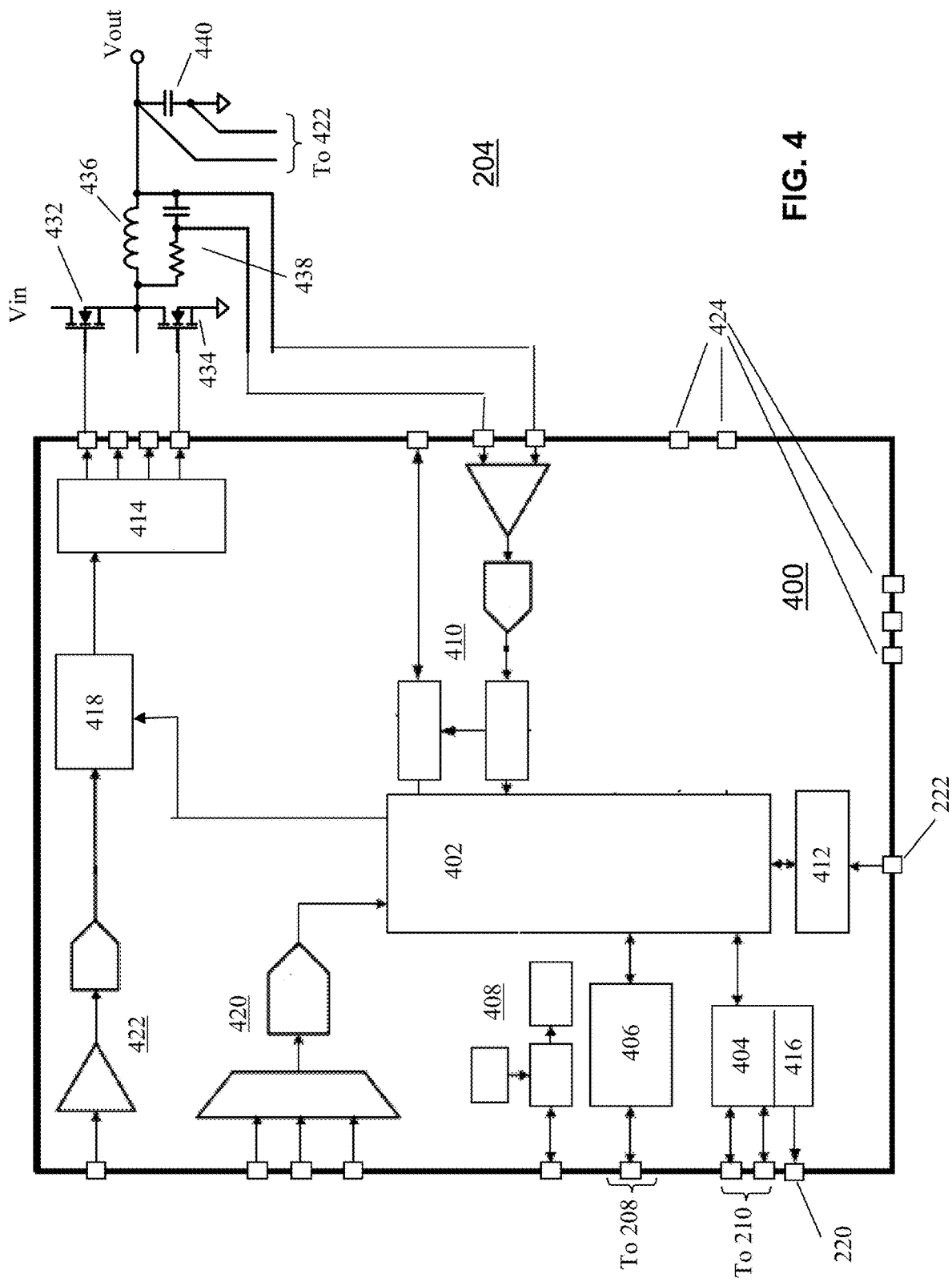
FIG. 4 is a block diagram illustrating an example controller that can be adapted for use in a system such as that shown in FIG. 2.

FIG. 4 is a block diagram illustrating an example controller 204 such as that shown in FIG. 2.

As shown, each controller/phase according to this example includes an integrated circuit 400 for controlling the supply of the regulated output voltage Vout based on an input voltage Vin using a pair of switching transistors 432/434 (e.g. power MOSFETs), an output filter including inductor 436 and capacitor 440 and PWM techniques known to those skilled in the art, and as will be described more fully below. The Vout pin of controller 204 shown in FIG. 2 is commonly connected to the Vout pin of each other controller/phase in a rail.

According to aspects of the present embodiments described above, IC 400 includes master/slave pin 220 and voltage/address pin 222. The master/slave pin 220 is read by block 416 (e.g. an ADC), which provides the value of the voltage that is hard-wired or connected to pin 220 to microcontroller 402. Likewise, the voltage/address pin 222 is read by block 412 (implemented using one or more ADC's and hard-wired resistor networks such as that described in U.S. Pat. No. 8,018,367), and the corresponding information is provided to microcontroller 402. As described in more detail above, microcontroller 402 (including a non-volatile memory (NVM) storing firmware, etc.) uses this information to perform the autoconfiguration methodologies of the present embodiments, including the power-up processing described above in connection with FIG. 3. As shown, IC 400 can further include other pins 424 that are used during power-up and other operations of controller 204. These pins can include pins coupled to local bus 210 and to SMBus/PMBus 208, with communications between controller 204 and these buses controlled by blocks 404 and 406, respectively. For example, as shown, block 406 can be coupled to a single pin for implementing SMBus/PMBus serial communications with a host via bus 208, and block 404 can be coupled to a pair of pins (e.g., a serial line and a clock line) for serial communications with other controllers via bus 210.

Microcontroller 402 can further perform standard control of the operation of controller 204, including the controlling of switches 432 and 434 using PWM modulator 418 and driver 414. For example, the output voltage is fed back from Vout and output capacitor 440 to an error amplifier 422 and to PWM modulator 418. Using this feedback and perhaps other control signals from microcontroller 402 (e.g. timing to ensure proper phase interleaving with other phases), PWM modulator 418 generates and adjusts the pulse width of the PWM signal provided to driver 414, which level shifts and provides the appropriate switching signals to transistors 432/434. It should be noted that in other embodiments, driver 414 can be included in a separate circuit or IC. Current information can also be derived from DCR network 438 and provided to a current block 410 (e.g. an ADC and a current synthesizer) and to microcontroller 402. This current information can also be shared with other controllers by block 410, and the shared current information from other controllers can also be received for implementing current balancing between phases.

During operation, and depending on whether controller 204 is configured as a master, microcontroller 402 can further perform other master operations. For example, clock circuitry 408 can generate a clock signal that is distributed to the other controllers in the rail, for example to control the common switching frequency. Likewise, telemetry information (e.g. temperature, etc.) can be collected from block 420 and distributed to the other controllers in the rail.

It should be noted that, according to aspects of the present embodiments, IC 400 can implement a master controller, a slave controller, and can be included in a rail with any number of phases, as well as to automatically operate as any phase number within the total number of phases. There is no need to be configured by an external host, or to store particular configuration in NVM, such as the NVM included in 402.

Figure 5:
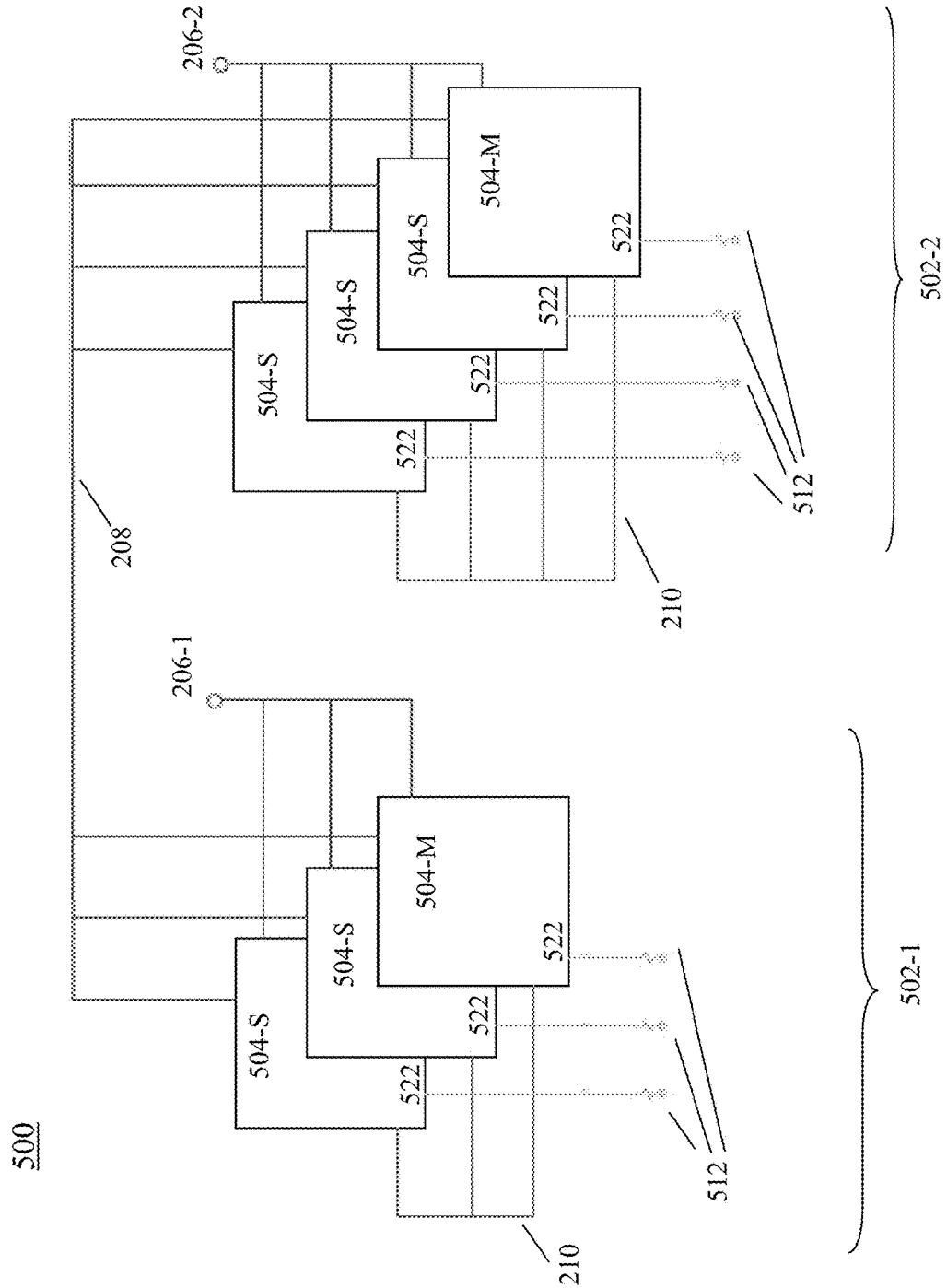
FIG. 5 is a block diagram of another example system having a plurality of rails including multiphase controllers according to the present embodiments.

FIG. 5 is a block diagram illustrating another example system according to embodiments. Similar to system 200 described above in connection with FIG. 2, the system 500 includes a plurality of rails (e.g. rail 502-1 and 502-2 as shown), with each rail 202 comprising an independent plurality of controllers 504 (i.e. phases), with the number of controllers 504 in each rail 202 possibly being different from each other. For example, as shown in FIG. 5, rail 202-1 includes three phases/controllers 504 and rail 202-2 includes four phases/controllers 504. Each rail 202 further supplies a respective output voltage 206 to one or more loads (not shown). Although only two rails are shown, it should be noted that the number of rails is not limited to this number and in some embodiments, the number of rails can be eight or higher. Further similar to the example shown in FIG. 2, the controllers 504 of each rail 202 are all communicatively coupled to a bus 208 (e.g. SMBus/PMBus), which may be further communicatively coupled to a host (not shown) such as a host as described above in FIG. 1. Meanwhile, each controller 504 in a rail is communicatively coupled to each other via a local bus 210.

According to some aspects, the embodiment shown in FIG. 5 uses only one pin on each controller 504 for configuration, in particular voltage/address pin 522. In this embodiment, the voltage/address pin 522 contains information that can be used to determine whether the controller is the master or a slave (denoted as 504-M or 504-S, respectively in FIG. 5). In addition, the voltage/address pin 522 is used to determine the value of the output voltage 206 for the respective rail 202, and also provides controller unique ID and address information for allowing each controller to be separately accessed via bus 208 and identified by other controllers via bus 210, as will be described in more detail below. In embodiments, the configuration of voltage/address pin 522 is implemented using a pinstrap, wherein the resistance values of a resistor network connected to pin 522 are used to select one of a plurality of predetermined combinations of output voltages, addresses and other identification information, using techniques described in U.S. Pat. No. 8,018,367 for example.

Those skilled in the art will be able to implement a controller 504 for use according to these embodiments by adapting a controller 204 such as that described in the example of FIG. 4, and using the example descriptions herein.

Figure 6:
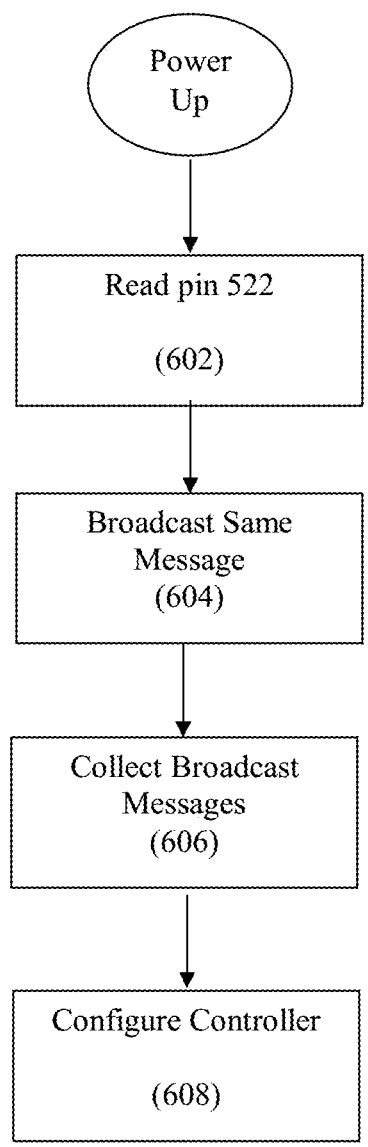
FIG. 6 is a flow diagram illustrating an example methodology of performing autoconfiguration of multiphase controllers such as those shown in FIG. 5 according to embodiments.

FIG. 6 is a flowchart illustrating an example methodology that can be used in a system such as that shown in FIG. 5.

When the system 500 is powered up each controller 504 reads its voltage/address pin 522 in block 602. In block 604, each device sends the same auto configuration message indicating their unique ID to all other controllers 504 via bus 210. In block 606, all of these auto configuration messages are received by all of the controllers in the rail, perhaps after a predetermined timeout interval. Based on these messages, each controller knows how many controllers are in the rail and their unique ID's. Using this information each controller configures itself in block 608 based on following algorithm:

The device with the lowest unique ID will be the master device and will be phase 0. This device will supply an external clock and telemetry information to the slave devices.

The device with the next lowest unique ID will be phase 1, the next lowest phase 2, and so on.

The devices will set their interleave value according to their phase number and number of phases in the rail.

The devices PMBus address will be determined by their unique ID.

One advantage of the present embodiments is that a broader range of system configurations can be achieved with fewer configuration pins or stored configurations. It also eliminates the need for the device to be configured using an external host. This is especially attractive to plug-and-play modular buck regulator design. These and other aspects are illustrated in the example of FIGS. 7A and 7B.

Figure 7B:
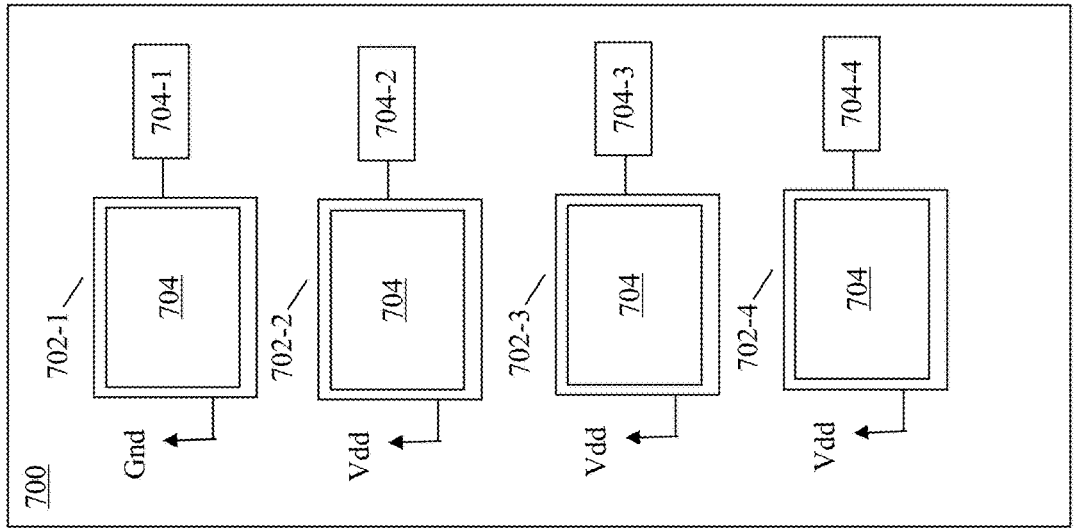
FIGS. 7A and 7B illustrate plug and play aspects of the present embodiments.
Figure 7A:
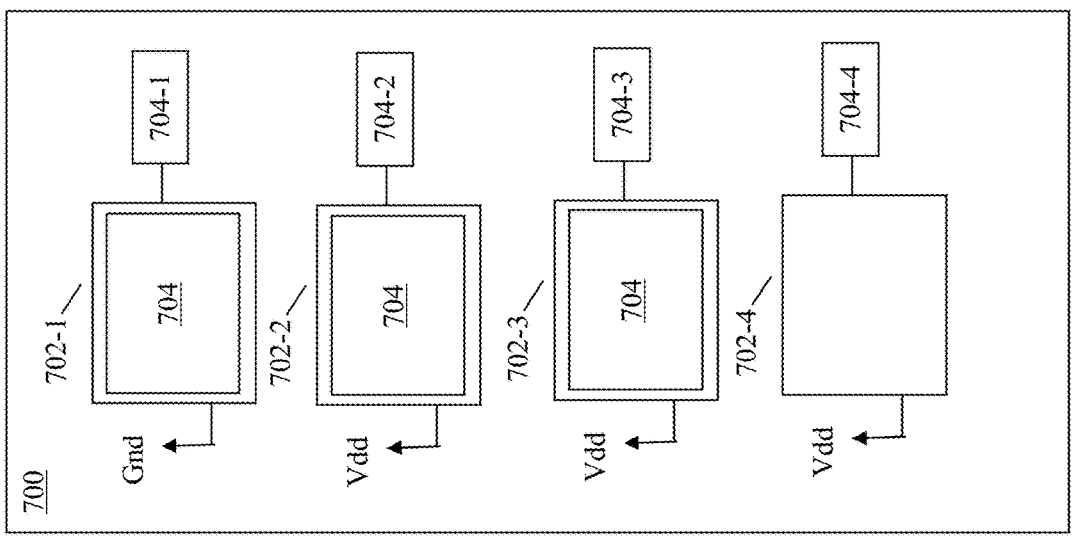

As shown in FIGS. 7A and 7B, a system 700 (e.g. a backplane, PCB, etc.) can include a plurality of sockets/plugs 702-1 to 702-4, each socket/plug being preconfigured to accept the pins of controller ICs 706. One socket/plug 702-1 can be hard-wired to provide a ground potential to a master/slave pin of a controller IC inserted therein, while the other socket/plugs 702-2 to 702-4 can be hard-wired to provide a Vdd potential to the controller ICs inserted therein. The socket/plugs 702-1 to 702-4 can also be hard-wired to respective resistor networks 704-1 to 704-4 that can connect to voltage/address pins of controller IC's inserted therein.

As shown in FIG. 7A, only three controller IC's 706 are plugged in/inserted into socket/plugs 702, thereby implementing a three-phase rail. Meanwhile, perhaps based on analyzing operation of system 700 (e.g. load demands, performance, efficiency, etc.), it is determined that another phase is needed in system 700. Accordingly, all that is needed to add another phase to system 700 is to plug another controller IC 706 into socket/plug 702-4, as shown in FIG. 7B. After powering up the system again, the controller IC's 706 in FIG. 7B automatically configure themselves as a four-phase rail. Moreover, if it is determined that any controller IC 706 has failed, a new IC 706 can simply be inserted into the corresponding socket/plug 702 and the system re-booted.

As should be apparent from the above descriptions, and according to aspects of the present embodiments, the same controller IC 706 can be used as either a master or slave, or in any rail among a plurality of rails in a system. Likewise, it can have any address or unique ID in the system.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A multiphase voltage regulator, comprising:
a plurality of controllers respectively associated with a plurality of phases of the multiphase voltage regulator, each controller of the plurality of controllers comprising:
a package having a plurality of pins, the plurality of pins including a master/slave pin and a voltage/address pin, the master/slave pin and the voltage/address pin being different from a clock pin of the plurality of pins; and
logic coupled to the master/slave pin and the voltage/address pin that is adapted to automatically configure the each controller as one of a master phase and a slave phase of the plurality of phases based on information from the master/slave pin and to automatically configure a unique address of the each controller based on information from the voltage/address pin.

2. The multiphase voltage regulator of claim 1, wherein the logic is further adapted to automatically configure an output voltage of the each controller based on the information from the voltage/address pin.

3. The multiphase voltage regulator of claim 1, further comprising a local bus connected to the plurality of controllers, wherein the logic is further adapted to automatically determine a phase number of the each controller based on information broadcast by the plurality of controllers on the local bus.

4. The multiphase voltage regulator of claim 3, wherein the logic is further adapted to automatically control phase interleaving for the each controller based on the determined phase number.

5. The multiphase voltage regulator of claim 1, wherein the information from the master/slave pin comprises a voltage value that is hard-wired to the master/slave pin.

6. The multiphase voltage regulator of claim 5, where the logic is further adapted to automatically configure the each controller as the master phase if the voltage value equals a first predetermined voltage value, and to automatically configure the each controller as the slave phase if the voltage value equals a second different predetermined voltage value.

7. The multiphase voltage regulator of claim 1, wherein the information from the voltage/address pin is obtained from a pinstrap that is hard-wired to the package.

8. A multiphase voltage regulator, comprising:
a plurality of controllers respectively associated with a plurality of phases of the multiphase voltage regulator, each controller of the plurality of controllers comprising:
a package having a plurality of pins, the plurality of pins including a single voltage/address pin being different from a clock pin of the plurality of pins; and
logic coupled to the single voltage/address pin that is adapted to automatically configure the each controller as one of a master phase and a slave phase of the plurality of phases based on information from the single voltage/address pin and to automatically configure a unique address of the each controller based on information from the single voltage/address pin.

9. The multiphase voltage regulator of claim 8, wherein the logic is further adapted to automatically configure an output voltage of the each controller based on the information from the single voltage/address pin.

10. The multiphase voltage regulator of claim 8, further comprising a local bus connected to the plurality of controllers, wherein the logic is further adapted to automatically determine a phase number of the each controller based on information broadcast by the plurality of controllers on the local bus.

11. The multiphase voltage regulator of claim 10, wherein the logic is further adapted to automatically control phase interleaving for the each controller based on the determined phase number.

12. The multiphase voltage regulator of claim 10, wherein the logic is further adapted to automatically configure the each controller as the master phase and the slave phase based on the information broadcast by the plurality of controllers on the local bus.

13. The multiphase voltage regulator of claim 8, wherein the information from the single voltage/address pin is obtained from a pinstrap that is hard-wired to the package.

14. A method for operating a multiphase voltage regulator, the multiphase voltage regulator comprising a plurality of controllers respectively associated with a plurality of phases of the multiphase voltage regulator, each controller of the plurality of controllers comprising a package having a plurality of pins, the plurality of pins including a first pin different from a clock pin of the plurality of pins, the method comprising, by the each controller of the plurality of controllers:
obtaining hard-wired information from the first pin; and
automatically configuring the each controller as one of a master phase and a slave phase of the plurality of phases based on the hard-wired information from the first pin.

15. The method of claim 14, further comprising:
obtaining hard-wired information from a second pin different from a clock pin of the plurality of pins; and
automatically configure a unique address of the each controller based on the hard-wired information from the second pin.

16. The method of claim 15, wherein the first pin is the same pin as the second pin.

17. The method of claim 14, further comprising:
obtaining hard-wired information from a second pin different from a clock pin; and
automatically configuring an output voltage of the each controller based on the hard-wired information from the second pin.

18. The method of claim 14, wherein the multiphase voltage regulator further comprises a local bus connected to the plurality of controllers, the method further comprising:
receiving information broadcast by the plurality of controllers on the local bus; and
automatically determining a phase number of the each controller based on the received broadcast information.

19. The method of claim 18, further comprising:
automatically controlling phase interleaving for the each controller based on the determined phase number.

20. The method of claim 14, wherein automatically configuring the each controller as the master phase and the slave phase is performed based on a predetermined voltage value hard-wired to the first pin.

21. The method of claim 14, wherein automatically configuring the each controller as the master phase and the slave phase is performed based on a pinstrap that is hard-wired to the package and the first pin.

* * * * *